US010465414B2

(12) United States Patent
Calle

(10) Patent No.: US 10,465,414 B2
(45) Date of Patent: Nov. 5, 2019

(54) FENCE SUPPORT SYSTEM

(71) Applicant: Christopher Andrew Calle, Dallas, TX (US)

(72) Inventor: Christopher Andrew Calle, Dallas, TX (US)

(*) Notice: Subject to any disclaimer, the term of this patent is extended or adjusted under 35 U.S.C. 154(b) by 11 days.

(21) Appl. No.: 15/053,600

(22) Filed: Feb. 25, 2016

(65) Prior Publication Data
US 2017/0058558 A1 Mar. 2, 2017

Related U.S. Application Data

(60) Provisional application No. 62/209,750, filed on Aug. 25, 2015.

(51) Int. Cl.
E04H 17/16 (2006.01)
E04H 17/06 (2006.01)
E04H 17/10 (2006.01)
F16B 5/06 (2006.01)

(52) U.S. Cl.
CPC ........... *E04H 17/06* (2013.01); *E04H 17/161* (2013.01); *E04H 17/10* (2013.01); *F16B 5/0664* (2013.01)

(58) Field of Classification Search
CPC ....... E04H 17/16; E04H 17/063; E04H 17/10; G09F 7/06; G09F 7/18; Y10T 16/05; Y10T 24/44026; E02F 9/2841; F16B 7/00; F16B 5/0664
USPC ........... 256/1, 24, 32, 45, 73, 47; 40/607.13, 40/607.14, 607.15, 611.12, 620, 622, 781; 411/512
See application file for complete search history.

(56) References Cited

U.S. PATENT DOCUMENTS

| 3,079,969 | A | * | 3/1963 | Buckley | F16B 2/246 411/303 |
| 3,192,823 | A | * | 7/1965 | Munse | F16B 37/044 24/625 |
| 3,964,197 | A | * | 6/1976 | Tucker | E04H 17/066 40/582 |
| 4,180,247 | A | * | 12/1979 | Pfarr, Jr. | E04H 17/10 24/563 |
| 5,441,239 | A | * | 8/1995 | Watson | E04H 17/02 256/1 |
| 5,784,762 | A | * | 7/1998 | Huntting | A01G 17/08 24/115 R |
| 5,897,281 | A | * | 4/1999 | Haga | F16B 37/0842 411/521 |
| 6,669,175 | B2 | * | 12/2003 | Snow | E04H 17/066 256/1 |

(Continued)

OTHER PUBLICATIONS

Omega Industrial Products, Inc., Rollup Up Fence Portable Barrier, brochure, 2014, 4 pages.

Primary Examiner — Amber R Anderson
Assistant Examiner — Nahid Amiri
(74) Attorney, Agent, or Firm — Lightfoot & Alford PLLC

(57) ABSTRACT

A fence support system includes a catch member having a protrusion and a retainer member having an aperture configured to receive the protrusion. A method of supporting an apertured fence material includes providing a catch member comprising a protrusion extending from a catch plate of the catch member, providing a retainer member comprising an aperture configured to receive the protrusion of the catch member, and capturing an apertured fence material between the catch member and the retainer member.

8 Claims, 13 Drawing Sheets

(56) References Cited

U.S. PATENT DOCUMENTS

| | | | | |
|---|---|---|---|---|
| 7,641,179 B2* | 1/2010 | Sherrard | ............... | E04H 17/00 |
| | | | | 256/32 |
| 8,263,863 B2* | 9/2012 | Young | ............... | H02G 3/0443 |
| | | | | 174/135 |
| 8,322,667 B2* | 12/2012 | Zannoni | ............ | A47G 23/0225 |
| | | | | 248/220.41 |
| 8,523,127 B1* | 9/2013 | Bennett | ................ | A47F 5/083 |
| | | | | 211/85.7 |
| 8,920,089 B1* | 12/2014 | Stewart | ............... | F16B 5/0258 |
| | | | | 411/112 |
| 2010/0043171 A1* | 2/2010 | Kwon | ............... | A44B 13/007 |
| | | | | 16/2.1 |
| 2010/0101045 A1* | 4/2010 | Van Walraven | ......... | F16L 5/00 |
| | | | | 16/2.1 |
| 2015/0194995 A1* | 7/2015 | Fathollahi | ........... | H04B 1/3888 |
| | | | | 455/575.8 |

\* cited by examiner

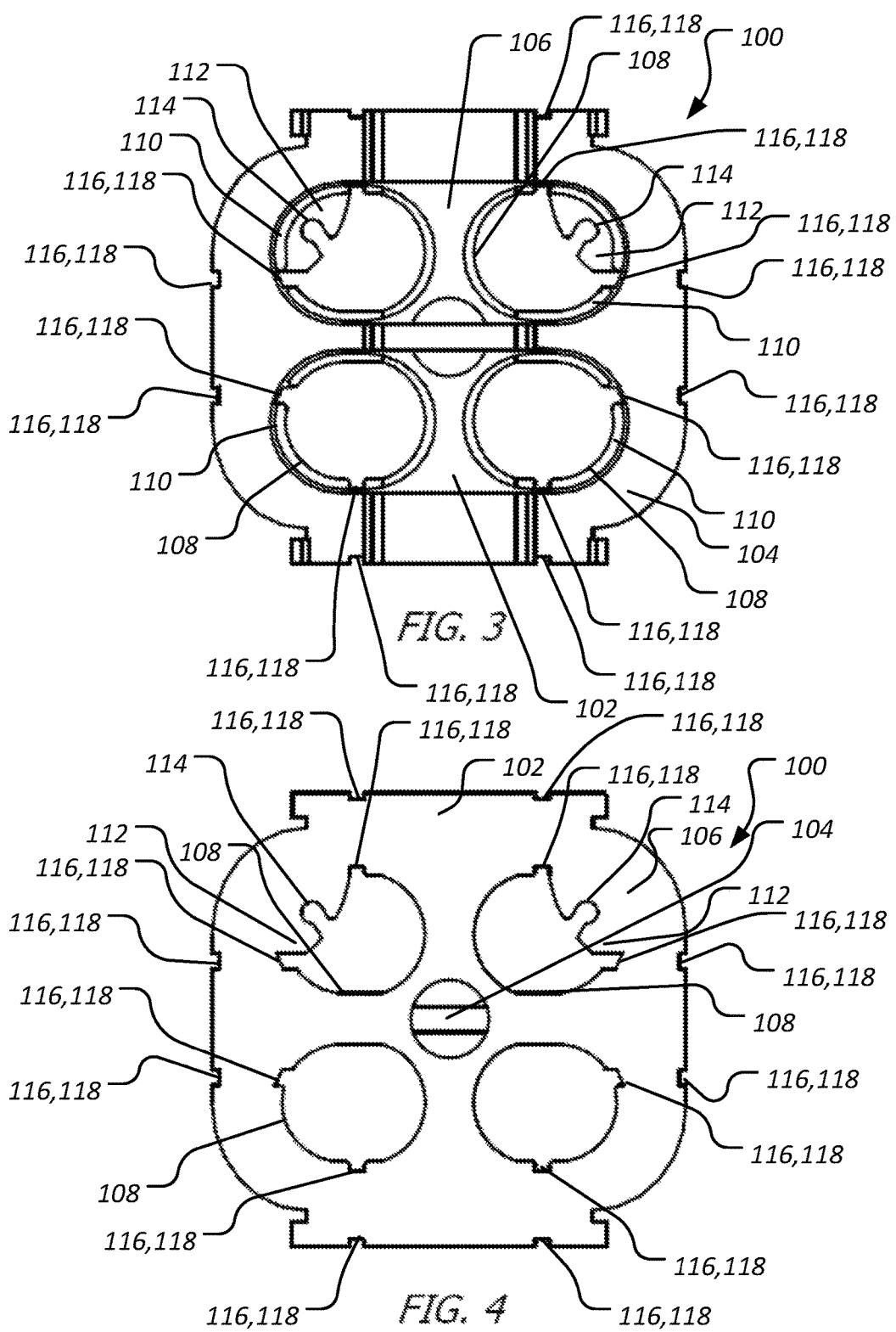

US 10,465,414 B2

FENCE SUPPORT SYSTEM

CROSS-REFERENCE TO RELATED APPLICATIONS

This patent application claims the benefit of the filing date of the U.S. Provisional Patent Application Ser. No. 62/209,750, filed on Aug. 25, 2015 and entitled "Support System," the entire content of which is hereby expressly incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some flexible fences, such as, but not limited to, apertured fencing and/or safety fencing, is difficult to maintain in good condition and/or to terminate in a structurally beneficial and/or convenient manner.

BRIEF DESCRIPTION OF THE DRAWINGS

FIG. 3 is an orthogonal front view of a fence support system.

FIG. 4 is an orthogonal rear view of the fence support system of FIG. 3.

DETAILED DESCRIPTION

Figure 1:
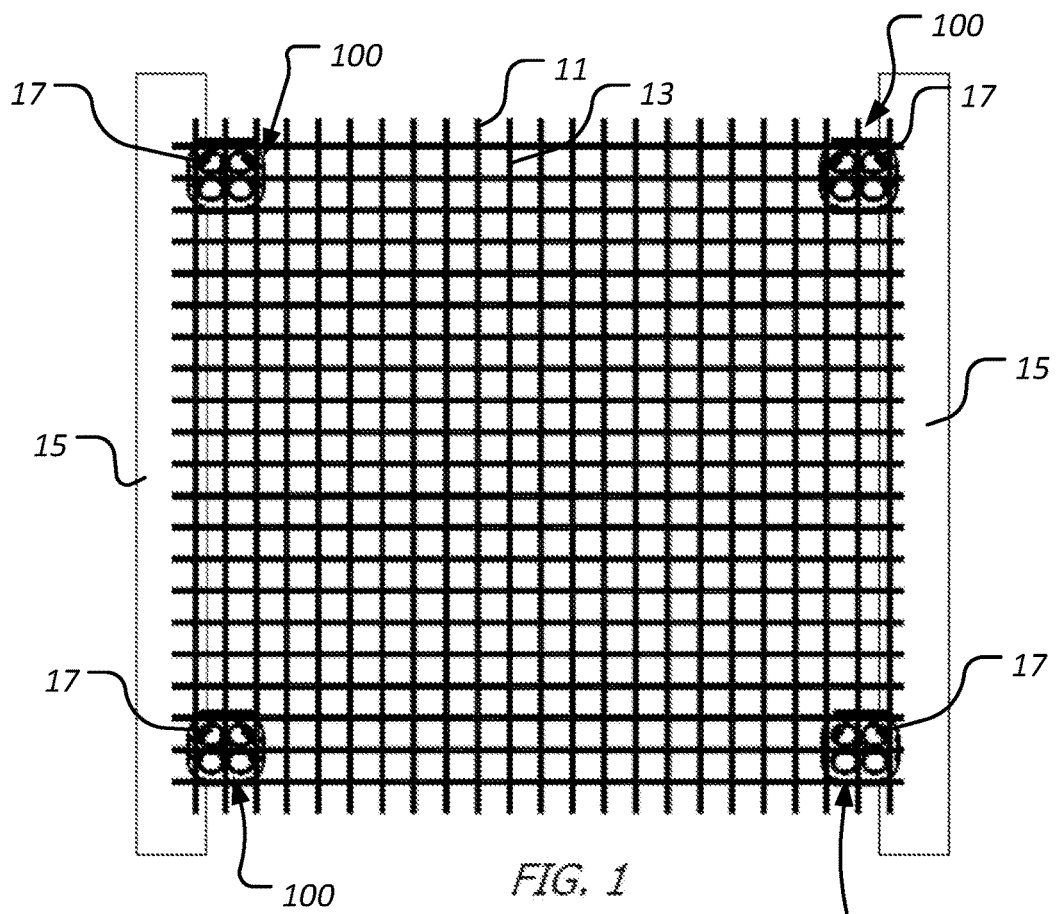
FIG. 1 is an orthogonal view of four fence support systems in use with a perforated fence material, two vertical supports, and four fasteners.

Referring now to FIG. 1, an orthogonal front view of portions of four fence support systems 100 are shown in use with an apertured fence material 11. In this embodiment, the fence material 11 comprises a grid of material pieces that together define apertures 13. In some cases, the fence material 11 may be of the sort commonly referred to as plastic security fencing, safety fencing, and the like. In alternative embodiments, the fence material 11 may comprise any other suitable shape of apertures or arrangement of spacing of apertures relative to each other so that any other suitable matrix, array, or geometric organization of apertures may be provided. In still other embodiments, the apertured fence material may be substantially a solid sheet of material with only so many apertures as necessary to complement the later described protrusions of the fence support systems 100. In this embodiment, the fence support systems 100 are connected to a vertical support 15, such as, but not limited to, a wooden post, through the use of a fastener 17. In this embodiment, the fastener comprises a nail, however, in alternative embodiments, the fastener 17 may comprise a screw, a bolt, a zip tie, a wire, or any suitable fastener, fixed point, or semi-permanently fixed point.

Figure 2:
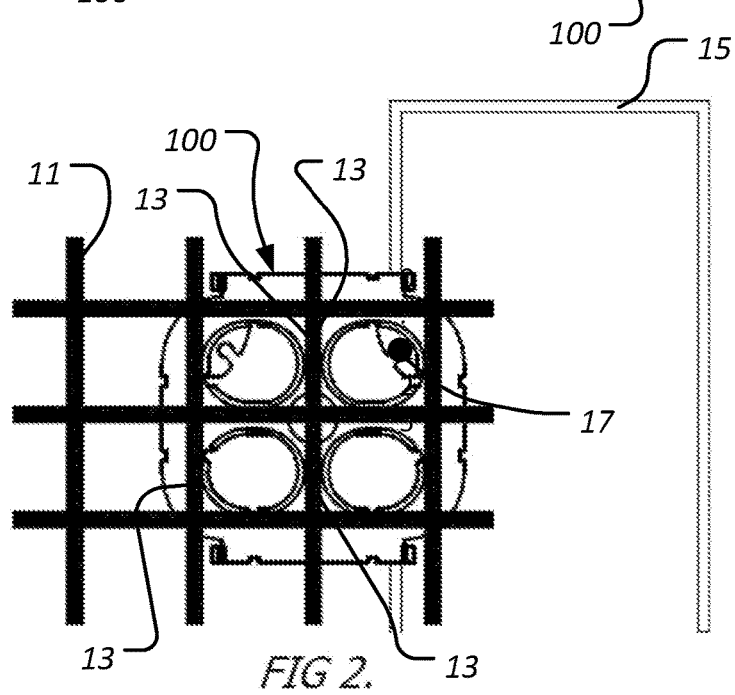
FIG. 2 is a closer orthogonal view of a fence support system in use with a perforated fence material, a vertical support, and a fastener.
Figure 5:
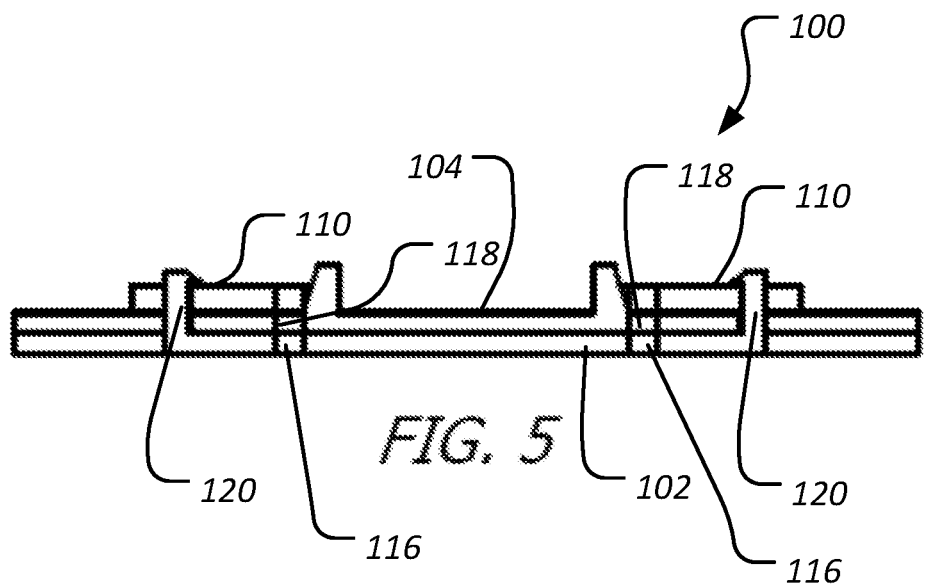
FIG. 5 is an orthogonal bottom view of the fence support system of FIG. 3.
Figure 6:
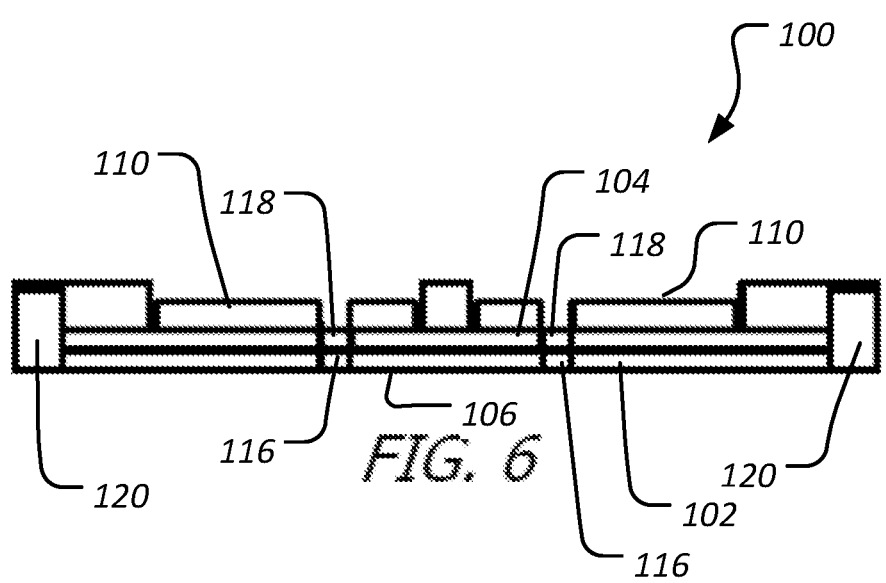
FIG. 6 is an orthogonal side view of the fence support system of FIG. 3.
Figure 7:
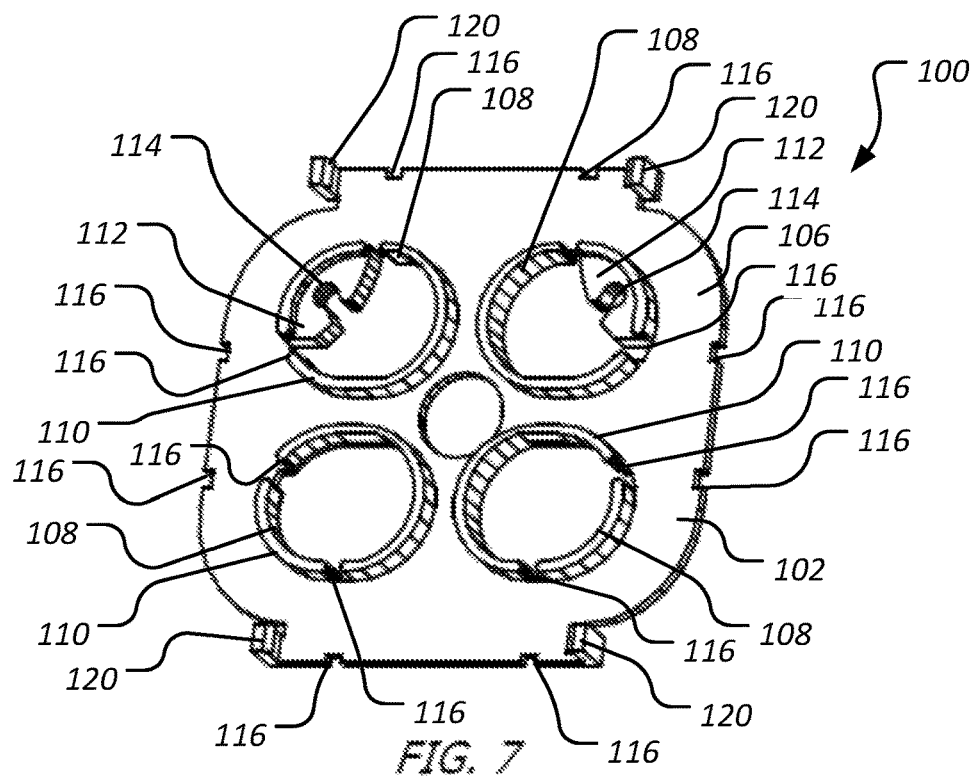
FIG. 7 is an oblique front view of a support unit of the fence support system of FIG. 3.
Figure 8:
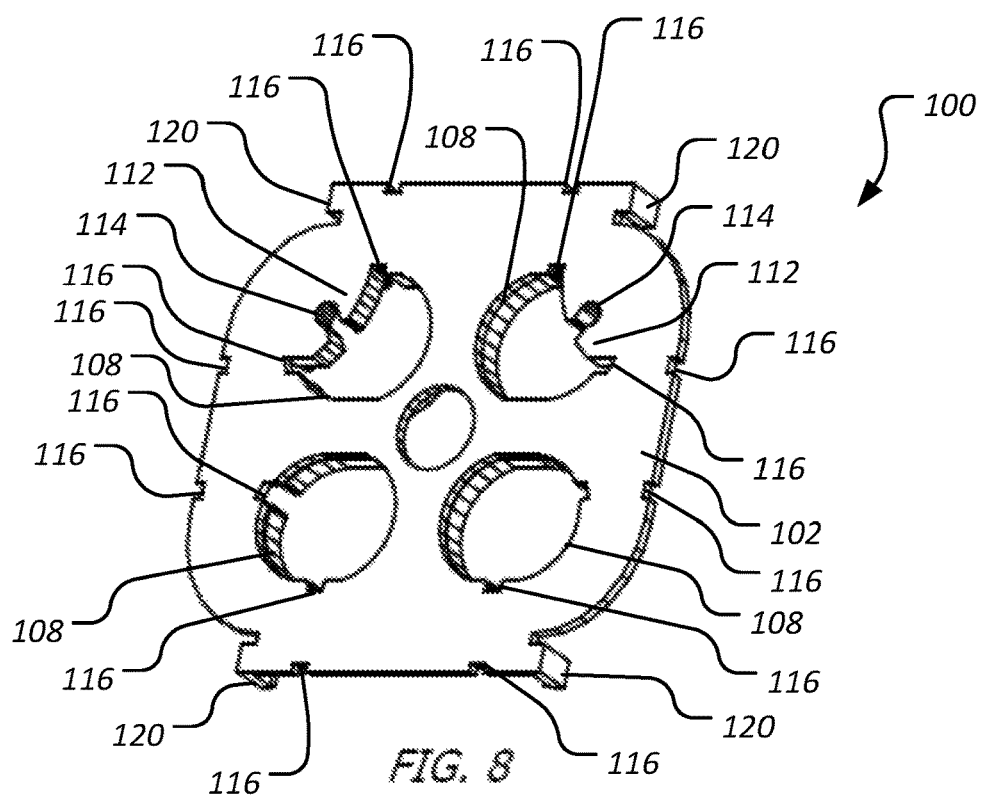
FIG. 8 is an oblique rear view of the support unit of FIG. 7.
Figure 9:
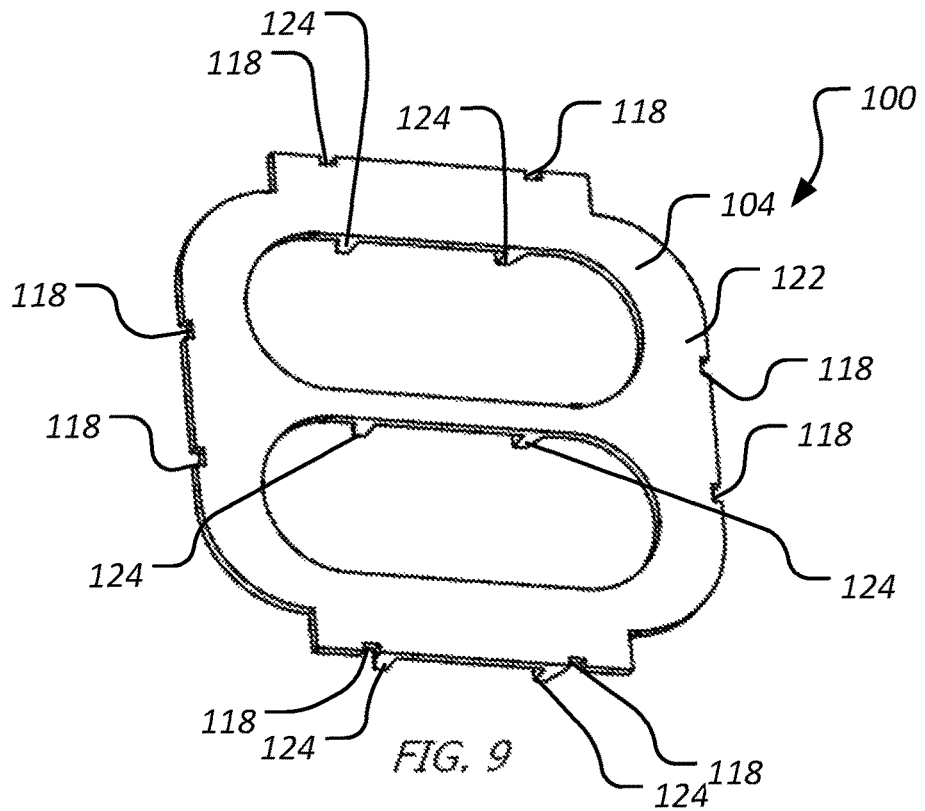
FIG. 9 is an oblique rear view of a retainer unit of the fence support system of FIG. 3.
Figure 10:
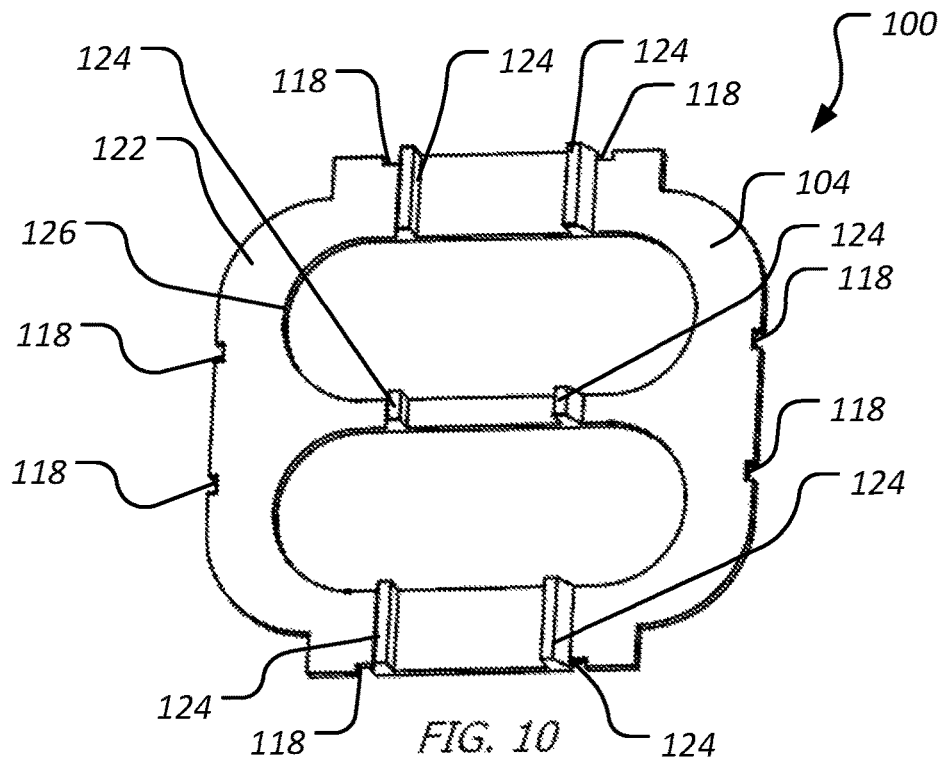
FIG. 10 is an oblique front view of the retainer unit of FIG. 9.

Referring now to FIG. 2, a closer orthogonal front view of a fence support system 100 is shown in greater detail. While the fence support system 100 comprises a catch unit 102 and a retainer unit 104, only the catch unit 102 is shown in use with the fence material 11. As shown, the fence support system engages four apertures 13 of the fence material 11.

Referring now to FIGS. 3-10, a fence support system 100 is shown in greater detail. In this embodiment, each fence support system 100 comprises a catch unit 102 and a retainer unit 104. Most generally, the catch unit 102 is configured to comprise a catch plate 106 comprising apertures 108. In some cases, the apertures 108 may be shaped complementary to apertures 13 of fence material 11. However, in alternative embodiments, the catch plate 106 may not comprise apertures sized to complement the apertures 13. The catch plate 106 further comprises protrusions 110 sized, shaped, and/or configured relative to each other to complement one or more apertures 13. In this embodiment, the protrusions 110 extend forward from a front of the catch plate 106. The protrusions 110 generally comprise a substantially continuous raised wall that closely borders and/or at least partially forms a boundary of the apertures 108. In this embodiment, two of the apertures 108 are at least partially defined and/or obstructed by a mount tab 112 comprising a mount channel 114. The mount tabs 112 generally extend toward a center of the aperture from at least one of the catch plate 106 and/or protrusions 110. The mount channel 114 is disposed so that an opening is formed in the mount tab 112 and the opening is configured to receive a fastener 17 therein. In some embodiments, the mount channel 114 may be oriented relative to a prescribed use orientation of the fence support system 100 so that the mount channels 114 generally extend in both upward and away from a center of the fence support system 100. In this embodiment, tie notches 116 of the catch unit 102 and the complementarily disposed tie notches 118 of the retainer unit 104 are provided to accept closure devices, such as, but not limited to, zip ties, wires, string, rope, and the like to provide a primary or secondary selective joinder between the catch unit 102 and the retainer unit 104. In other words, when catch unit 102 and retainer unit 104 are mated as shown in FIGS. 3 and 4, zip ties and/or other devices can be passed through geometrically opposing notches 116 and tightened to selectively lock the catch unit 102 and retainer unit 104 relative to each other. In use, the zip ties and/or other devices would typically be applied after sandwiching fence material 11 between the catch unit 102 and the retainer unit 104. In this embodiment, the catch unit 102 further comprises one or more hooks 120 protruding forward beyond the catch plate 106. The hooks 120 are generally configured to selectively engage and/or retain a portion of the retainer unit 104. In this embodiment, the hooks 120 are formed integrally with the catch plate 106 and are inherently spring biased as a function of the material elasticity of the hooks 120 and catch plate 106. In this embodiment, retainer unit 104 comprises a retainer plate 122, walls 124 for capturing a post, such as, but not limited to, a standard T-post between left-right opposing walls 124, and the previously described notches 118. The retainer unit further comprises apertures 126 configured to receive two protrusions 110 through each aperture 126. In alternative embodiments, the protrusions 110 may comprise concave channels formed on an exterior wall of the protrusions 110. In some cases, the concave channels can assist in retaining fencing material 11 relative to the protrusions. In other alternative embodiments, the protrusions may comprise features configured to allow one or more of an interference fit between the protrusions 110 and the apertures 126 and a snap fit between the protrusions 110 and the apertures 126, in some cases, thereby reducing any need for the above-mentioned hooks 120.

Figure 11:
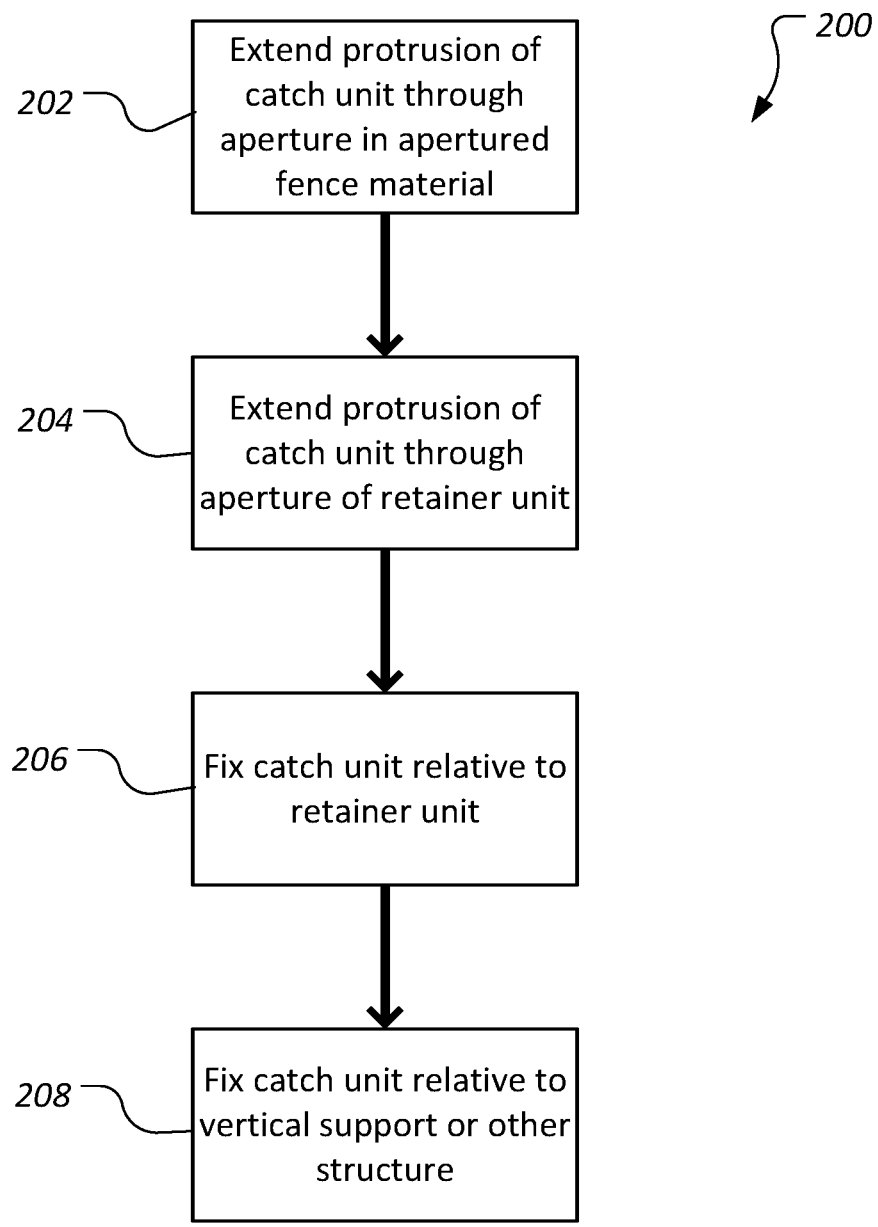
FIG. 11 is a flowchart of a method of supporting a fence.
Figure 12:
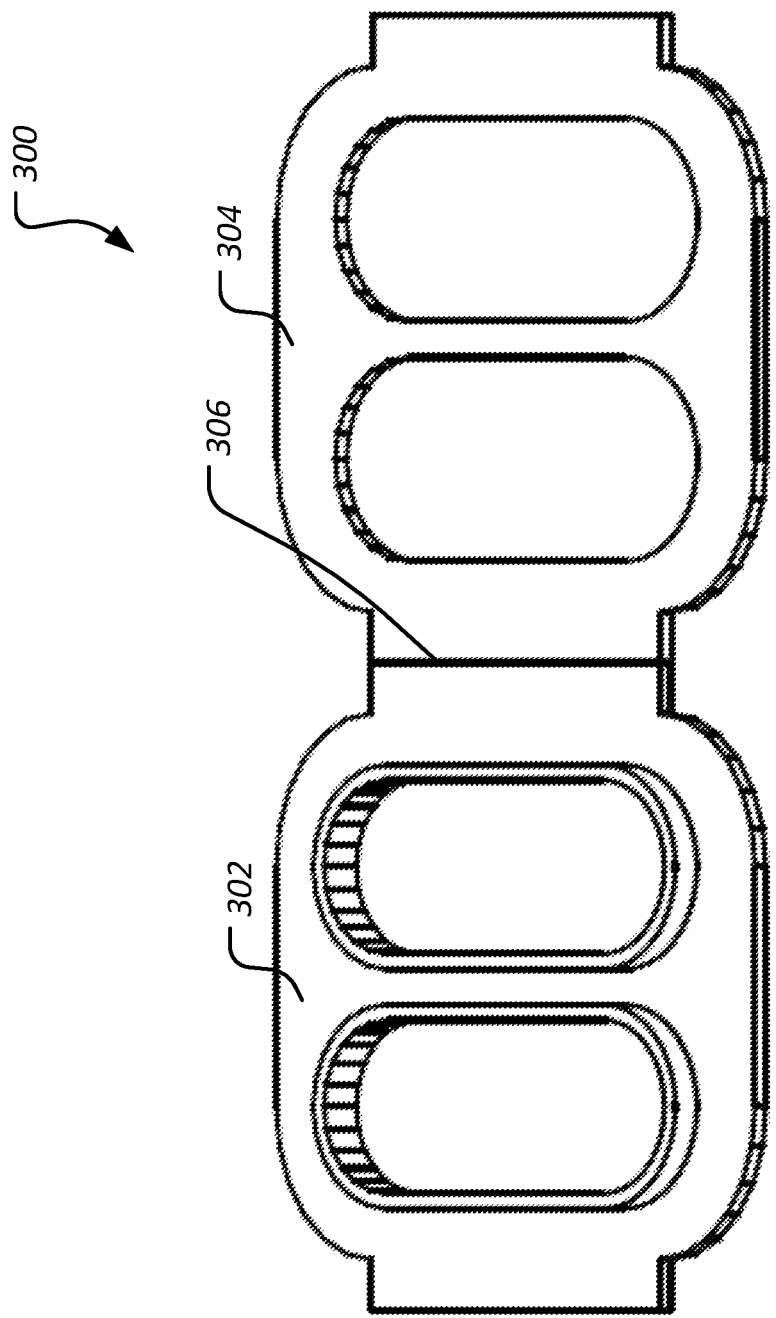
FIG. 12 is an oblique view of another fence support system in an open configuration.
Figure 13:
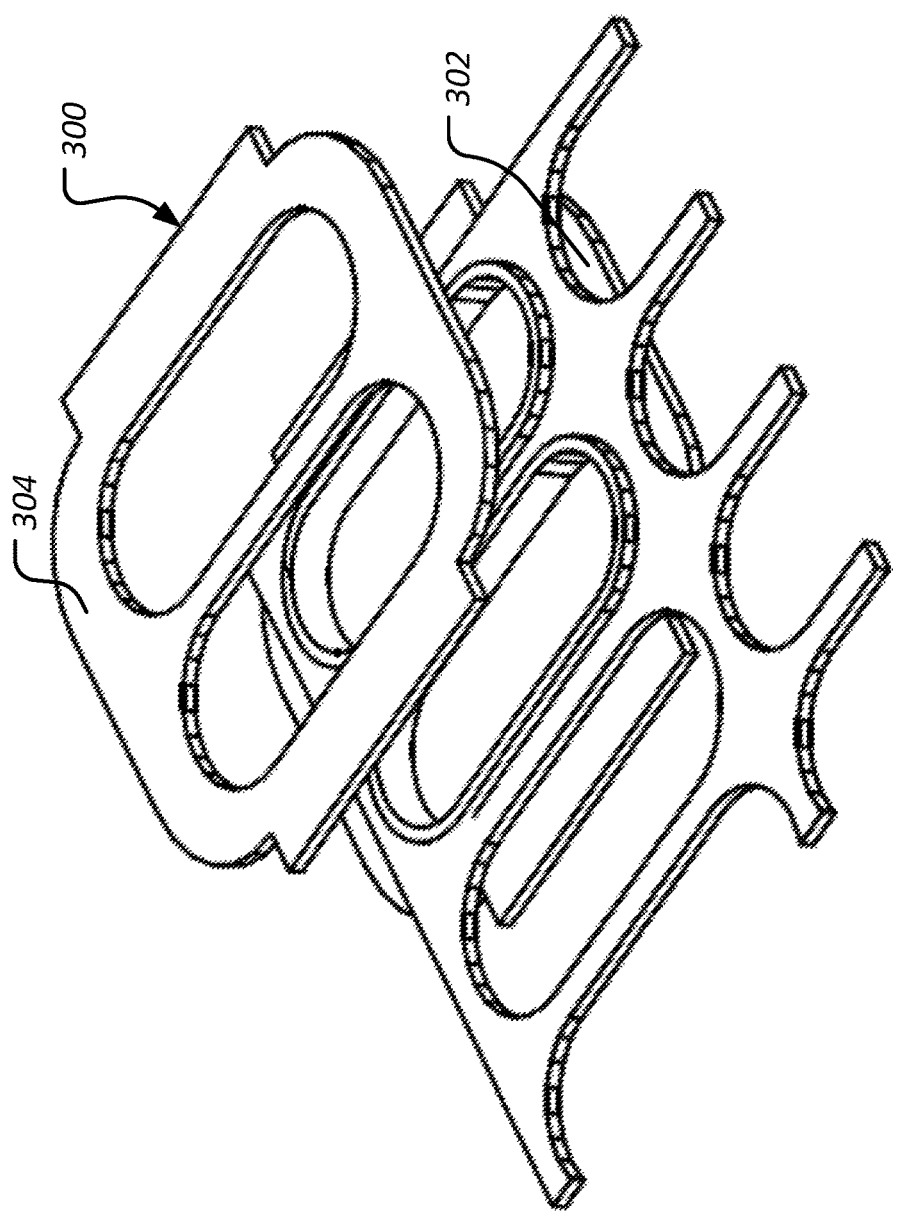
FIG. 13 is an oblique view of a fence support system in an open configuration and in relation to an apertured safety fence.
Figure 14:
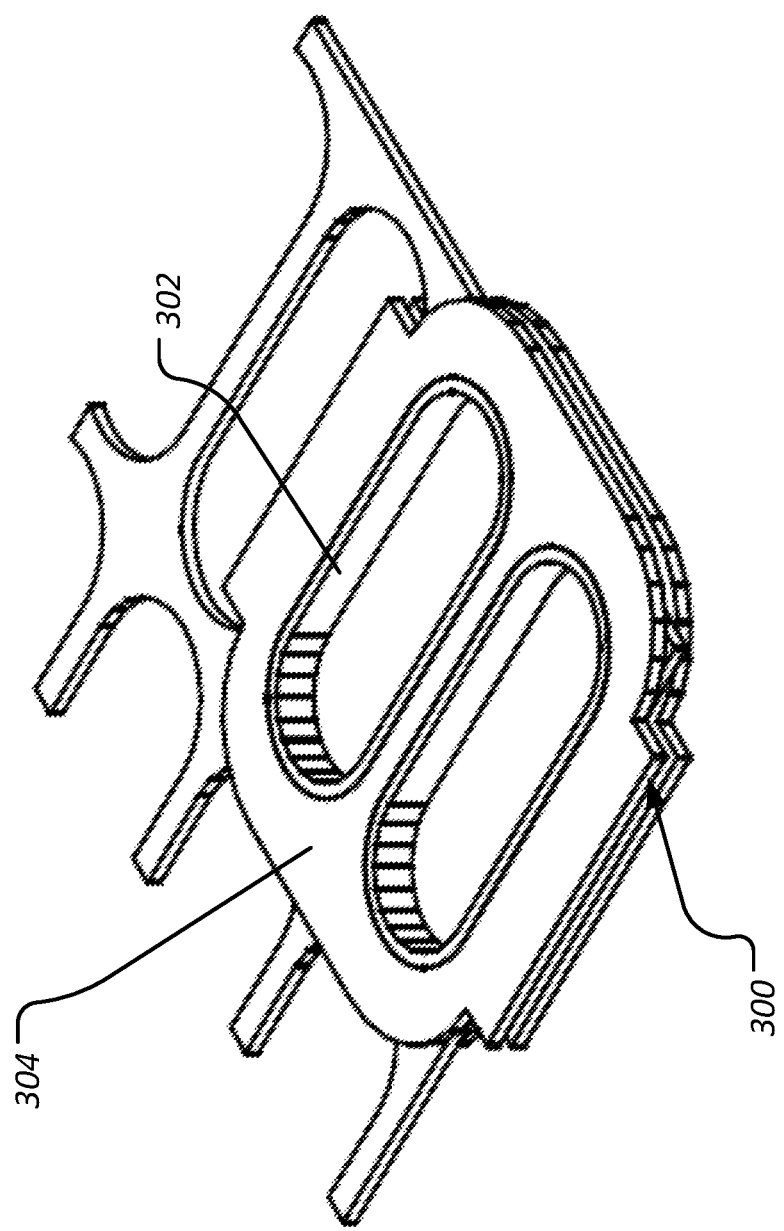
FIG. 14 is an oblique view of a fence support system in a closed configuration and attached to an apertured safety fence.
Figure 15:
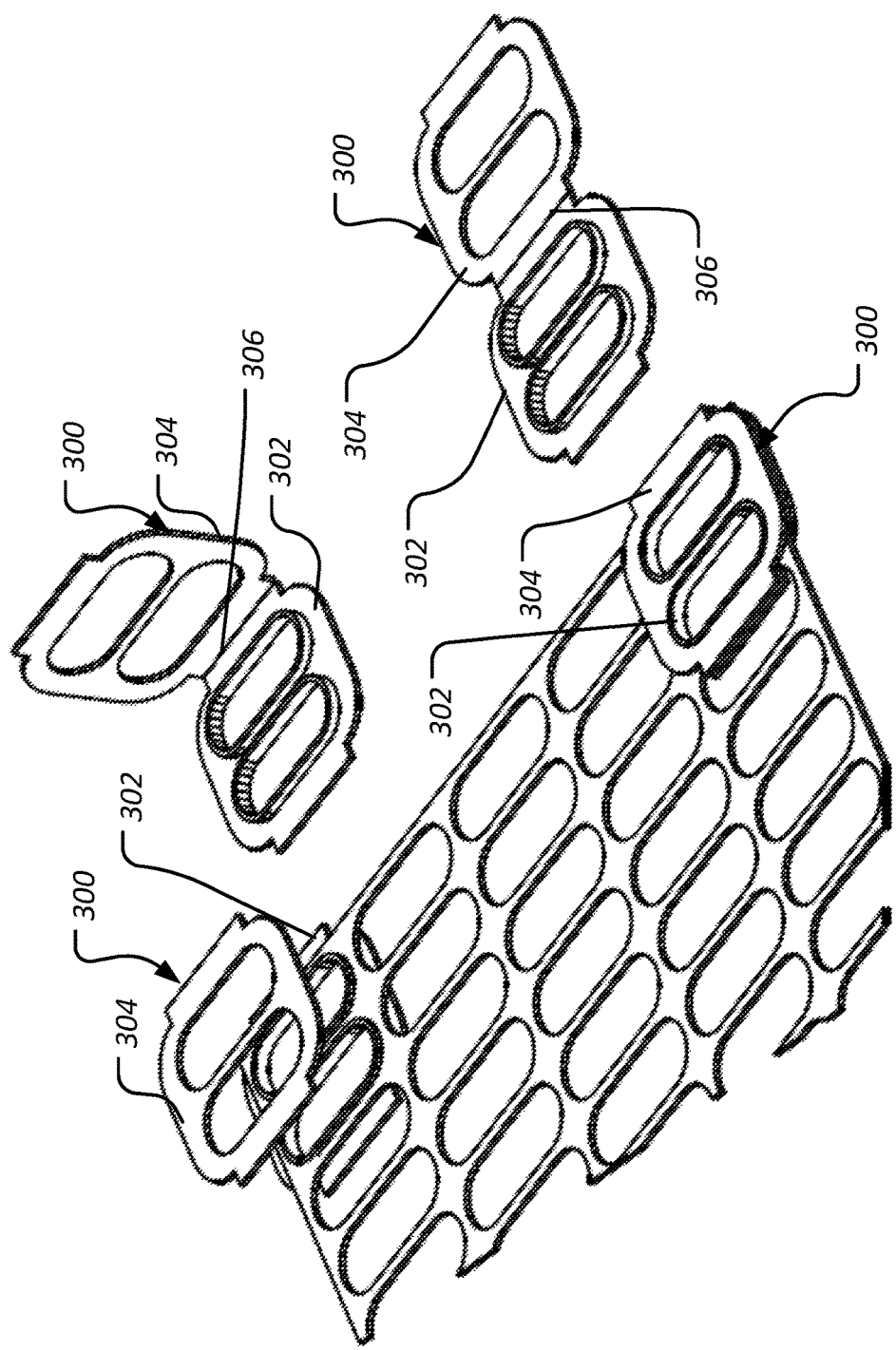
FIG. 15 is an oblique view of a plurality of fence support systems in a variety of configurations and in relation to an apertured safety fence.
Figure 16:
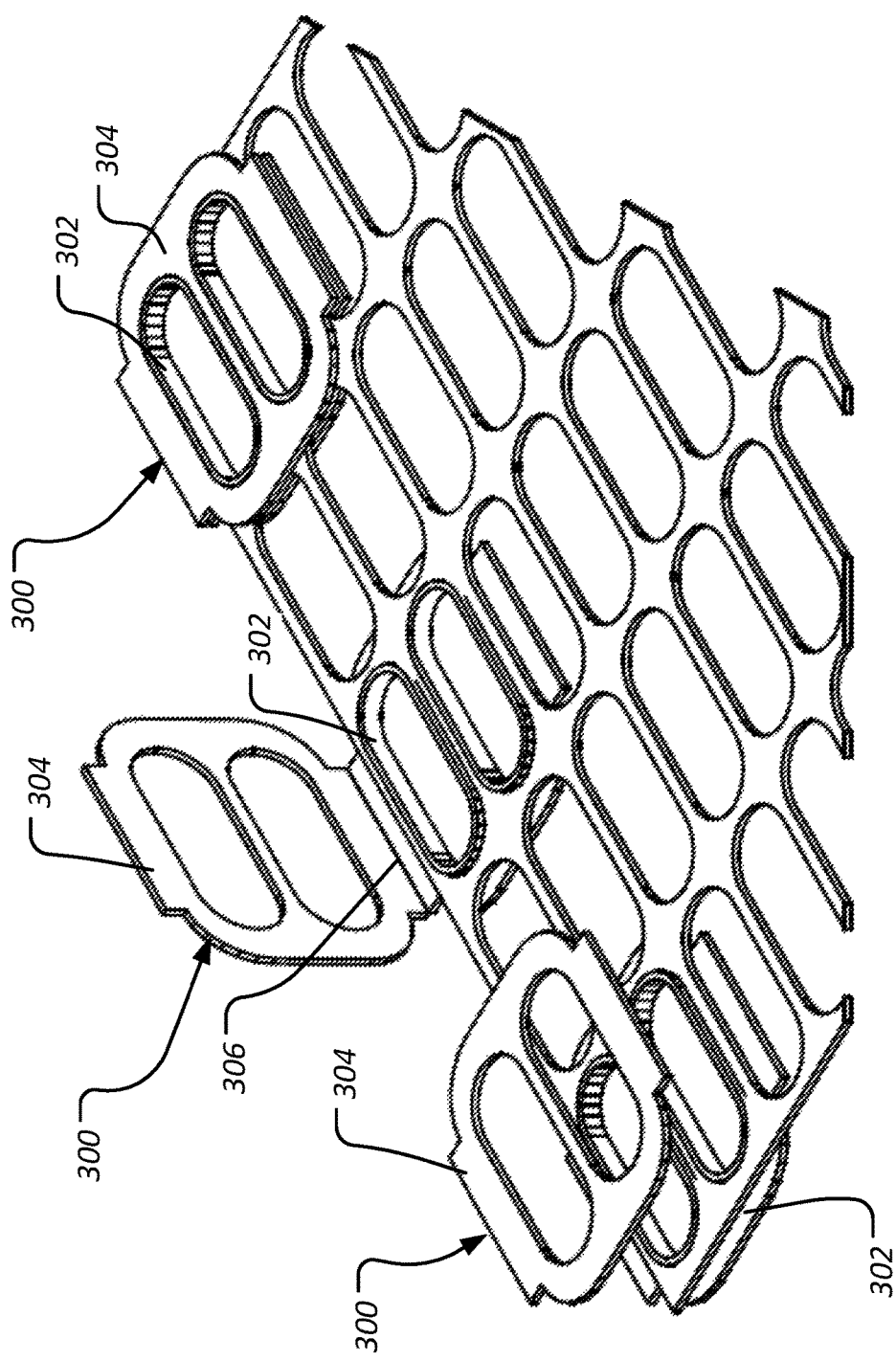
FIG. 16 is another oblique view of a plurality of fence support systems in a variety of configurations and in relation to an apertured safety fence.

Referring now to FIG. 11, a flowchart of a method 200 of supporting a fence is shown. The method 200 may begin at block 202 by extending a protrusion 110 of the catch unit 102 through an aperture 13 of apertured fence material 11. The method 200 may continue at block 204 by further extending the protrusion 110 through an aperture 126 of the retainer unit. The method 200 may continue at block 206 by fixing the catch unit 102 relative to the retainer unit 104. In some embodiments, the fixing of the catch unit 102 relative to the retainer unit 104 may comprise utilizing zip ties or other devices with notches 116,118, an interference fit between the protrusion 110 and the aperture 126, and/or a snap fit between the protrusion 110 and the aperture 126. The method 200 may continue at block 208 by vertically supporting the catch unit 102, retainer unit 104, and/or the apertured fence material 11 to a vertical support 15 or any other suitable device or structure.

Referring now to FIGS. 12-16, an alternative embodiment of a fence support system 300 is disclosed. The fence support system 300 generally comprises a catch member 302 comprising protrusions configured to complement an aperture shape of an apertured fence material. The fence support system 300 further comprises a retainer member 304 configured to complement the catch member 302 so that the protrusions of the catch member 302 can be securely received and selectively retained within apertures of the retainer member 304. In some embodiments, the protrusion of the catch member 302 can be received through the apertures of an apertured fence material and further received into the apertures of the retainer member 304 so that the apertured fence material is sandwiched between the catch member 302 and the retainer member 304. In some cases, the apertured fence material can be handled by the attached fence support system 300. In some cases, the fence support system 300 can distribute forces to the aperture fence material in a relatively more distributed manner as compared to handling the aperture fence material without a fence support system 300 applied and/or attached. Accordingly, a fence comprising the apertured fence material can last longer and be handled more conveniently. In some embodiments, the catch member 302 is movably attached to the retainer member 304 via a hinge 306. While the apertures and protrusions shown are substantially oval-shaped, in alternative embodiments, the protrusions may alternatively be formed complementary to any other shape and/or pattern of shapes configured to complement the shapes and/or patterns of apertures of apertured safety fences. In still other embodiments, the protrusions may alternatively be formed without respect to a shape and/or pattern of shapes of an apertured fence material but may nonetheless be sized relative to one or more apertures of the apertured fence material so that the protrusion can be inserted into an aperture, even if the apertured fence material must be stretched to accommodate the protrusion.

Figure 17:
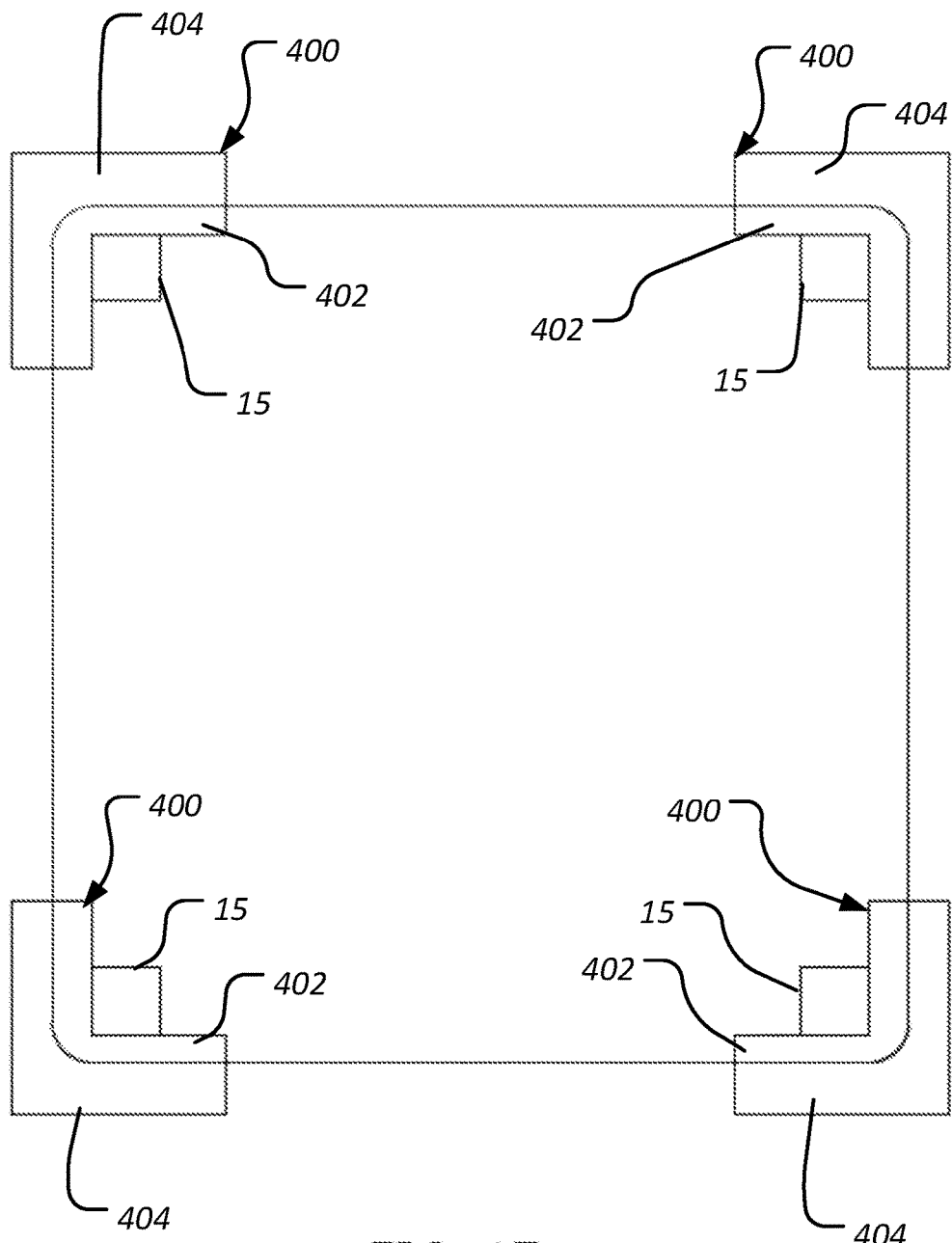
FIG. 17 is an orthogonal top view of four fence support systems in use with an apertured fence material and four vertical supports.
Figure 18:
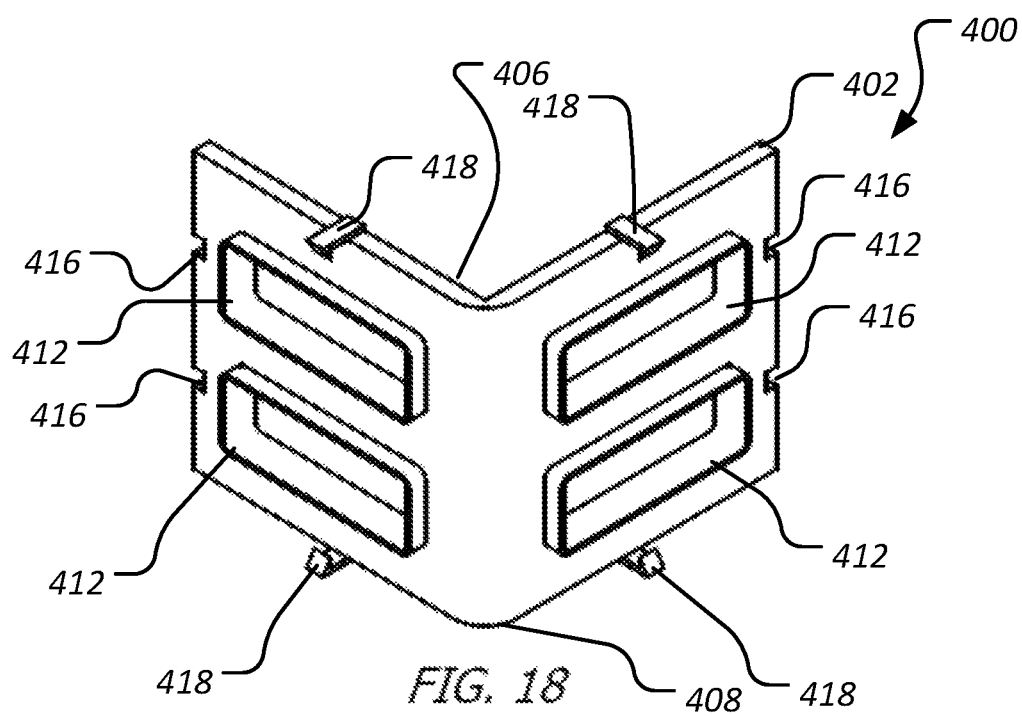
FIG. 18 is an oblique front view of a catch unit of another fence support system.
Figure 19:
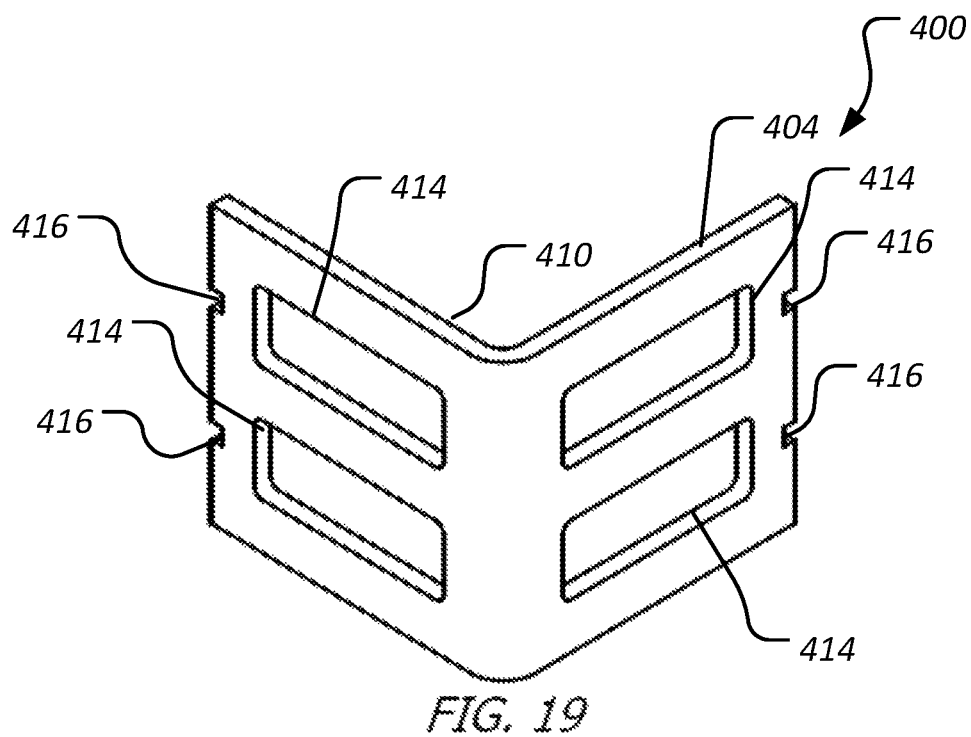
FIG. 19 is an oblique front view of a retainer unit of the fence support system of FIG. 17.

Referring now to FIGS. 17-19, an alternative embodiment of a fence support system 400 is shown. FIG. 17 shows four fence support systems 400 in use with four vertical supports 15 and apertured fence material 11. As shown, the fence support systems 400 can be utilized to provide a departure in angle or direction of fence material so that, as viewed from above, other than straight fences can be supported. As shown, the fence support systems 400 are configured to provide right angle directional changes in apertured fence material 11 captured by the fence support systems 400. In some cases, the fence support systems 400 can be utilized to effectively define an enclosed area within the bounds of the supported apertured fence material 11. The fence support system 400 is substantially similar to fence support systems 100 and 300 insofar as the manner in which apertured fence material is captured within the fence support system 400. More specifically, the fence support system 400 comprises a catch unit 402 and a retainer unit 404. The catch unit 402 generally comprises an inner profile 406 comprising a right angle interface configure for contact with box-shaped vertical supports 15. The catch unit 402 further comprises a curved radius outer profile 408 configured to interface apertured fence material 11. The retainer unit 404 comprises a curved radius inner profile 410 generally complementary to the outer profile 408. The catch unit 402 comprises protrusions 412 shaped generally complementarily to apertures 414 of the retainer unit. The catch unit 402 and the retainer unit 404 may further comprise notches 416 and hooks 418 for selectively retaining the catch unit 402 relative to the retainer unit 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A fence support system, comprising:
    a catch member comprising a catch plate and a protrusion that extends from the catch plate; and
    a retainer member comprising a retainer plate comprising an aperture, the aperture being configured to receive the protrusion;
    wherein when the protrusion is received by the aperture, at least a base portion of the protrusion that does not extend through the aperture is curved; and
    wherein the catch member comprises a tie notch configured to receive a closure device.

2. The fence support system of claim 1, wherein the aperture of the retainer member comprises a shape complementary to a shape of the protrusion of the catch member.

3. The fence support system of claim 1, wherein the protrusion extends substantially orthogonally from the catch plate.

4. The fence support system of claim 1, wherein the retainer member is configured for selective mating to the catch member so that an apertured fence material can be captured between the retainer plate and the catch plate.

5. The fence support system of claim 4, wherein when the retainer member is mated to the catch member, at least a portion of the protrusion of the catch member is received within the aperture of the retainer member.

6. The fence support system of claim 5, wherein when the retainer member is mated to the catch member and an apertured fence material is captured between the retainer plate and the catch plate, the protrusion is configured to extend through an aperture of the apertured fence material.

7. The fence support system of claim 1, further comprising:
    a mount tab configured to receive a fastener.

8. A fence support system, comprising:
    a catch member comprising a catch plate and a protrusion that extends from the catch plate; and
    a retainer member comprising a retainer plate comprising an aperture, the aperture being configured to receive the protrusion;
    wherein when the protrusion is received by the aperture, at least a base portion of the protrusion that does not extend through the aperture is curved; and
    wherein the retainer member comprises a tie notch configured for alignment with a tie notch of the catch member when the retainer member is substantially mated with the catch member.

* * * * *